United States Patent
Hasegawa et al.

(10) Patent No.: US 9,712,025 B2
(45) Date of Patent: Jul. 18, 2017

(54) MAGNET INSERTING APPARATUS FOR MAGNET INSERTION INTO MAGNET INSERTION SLOTS OF ROTOR CORE AND METHOD THEREOF

(71) Applicant: NISSAN MOTOR CO., LTD., Yokohama-shi, Kanagawa (JP)

(72) Inventors: Kiyoshi Hasegawa, Yokohama (JP); Takumi Ohshima, Yokohama (JP); Yasushi Matsushita, Yokohama (JP); Akihisa Hori, Yokohama (JP); Michito Kishi, Atsugi (JP); Takashi Sekikawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/783,877

(22) PCT Filed: Mar. 18, 2014

(86) PCT No.: PCT/JP2014/057241
§ 371 (c)(1),
(2) Date: Oct. 12, 2015

(87) PCT Pub. No.: WO2014/167951
PCT Pub. Date: Oct. 16, 2014

(65) Prior Publication Data
US 2016/0072370 A1    Mar. 10, 2016

(30) Foreign Application Priority Data

Apr. 10, 2013  (JP) ................................. 2013-082224

(51) Int. Cl.
*H02K 15/03* (2006.01)
*H02K 15/02* (2006.01)
*H02K 1/27* (2006.01)

(52) U.S. Cl.
CPC ............ *H02K 15/02* (2013.01); *H02K 1/276* (2013.01); *H02K 15/03* (2013.01)

(58) Field of Classification Search
CPC ......... H02K 15/02; H02K 15/03; H02K 1/276
See application file for complete search history.

(56) References Cited

U.S. PATENT DOCUMENTS 4,587,721 A * 5/1986 Muller .................. H02K 1/278
29/596
4,933,582 A * 6/1990 Hata ..................... H02K 5/145
310/154.14

(Continued)

FOREIGN PATENT DOCUMENTS

JP    2011-078268 A    4/2011
JP    2012-039746 A    2/2012

(Continued)

*Primary Examiner* — Minh Trinh
(74) *Attorney, Agent, or Firm* — Young Basile Hanlon & MacFarlane, P.C.

(57) ABSTRACT

A magnet inserting apparatus inserts a plurality of magnet parts into each of the magnet insertion slots provided in the rotor core of a motor. The magnet inserting apparatus comprises a guiding unit equipped with a magnet inlet and a magnet outlet and is configured to align the plurality of magnet parts inserted through the magnet inlet until the inserted magnet parts are ejected from the magnet outlet, and to guide the aligned magnet parts so as to be inserted from the magnet outlet to the magnet insertion slot. A size of the magnet inlet of the guiding unit is larger than a size of the magnet insertion slot, a size of the magnet outlet is the same as or smaller than the size of the magnet insertion slot, and the guiding unit is formed so that a shape from the magnet inlet to the outlet becomes a taper shape.

5 Claims, 10 Drawing Sheets

(56) References Cited

U.S. PATENT DOCUMENTS

| | | | |
|---|---|---|---|
| 8,844,600 B2 * | 9/2014 | Hirata | B21D 43/22 156/513 |
| 2004/0046469 A1 | 3/2004 | Oshima et al. | |
| 2011/0079325 A1 | 4/2011 | Doi et al. | |
| 2016/0049851 A1 * | 2/2016 | Hasegawa | H02K 15/03 29/598 |
| 2016/0072370 A1 * | 3/2016 | Hasegawa | H02K 1/276 29/598 |

FOREIGN PATENT DOCUMENTS

| | | |
|---|---|---|
| WO | 01-95460 A1 | 12/2001 |
| WO | 2011061806 A1 | 5/2011 |

\* cited by examiner

MAGNET INSERTING APPARATUS FOR MAGNET INSERTION INTO MAGNET INSERTION SLOTS OF ROTOR CORE AND METHOD THEREOF

CROSS REFERENCE TO RELATED APPLICATION

The present application claims priority to Japanese Patent Application No. 2013-082224 filed on Apr. 10, 2013 all of which is incorporated herein by reference.

TECHNICAL FIELD

The present invention relates to a technique for inserting a magnet into a magnet insertion slot of a rotor core.

BACKGROUND

A technique has been known from the past of using a long plate-shaped magnet formed by integrating a plurality of divided magnet parts, as a magnet to be inserted into magnet insertion slots of a rotor core of a motor (see WO2001/095460A). By forming the magnets to be inserted into magnet insertion slots with the plurality of magnet parts as mentioned above to reduce volume of the individual magnet parts, it is possible to reduce the eddy current generated by the variation of an acting magnetic field.

Since a large cost is incurred for bonding the plurality of the magnet parts to form the long plate-shape, a method is considered for cost reduction in which a bonding process of the plurality of the magnet parts is omitted and a plurality of the magnet parts is inserted into the magnet insertion slots of the rotor core as it is.

However, the space between the magnet parts and the magnet insertion slot of the rotor core is so narrow that a problem arises in which the magnet parts cannot be inserted thereinto unless the magnet parts are positioned with high precision just above the magnet insertion slot.

SUMMARY

An object of the present invention is to provide a technique enabling insertion of a magnet part into a magnet insertion slot of a rotor core without requiring any high precision positioning.

According to one embodiment, there is provided a magnet inserting apparatus into magnet insertion slots of a rotor core for inserting a plurality of magnet parts into each of the magnet insertion slots provided in the rotor core of a motor, the magnet inserting apparatus comprises a guiding unit equipped with a magnet inlet and a magnet outlet, the guiding unit being configured to align the plurality of magnet parts inserted through the magnet inlet until the inserted magnet parts are ejected from the magnet outlet, the guiding unit being configured to guide the aligned magnet parts so as to be inserted from the magnet outlet to the magnet insertion slot. A size of the magnet inlet is larger than a size of the magnet insertion slot, a size of the magnet outlet is the same as or smaller than the size of the magnet insertion slot, and the guiding unit is formed so that a shape from the magnet inlet to the magnet outlet becomes a taper shape.

Embodiments of the present invention will be explained in detail hereafter, together with the attached drawings.

DESCRIPTION OF THE EMBODIMENTS

Figure 1:
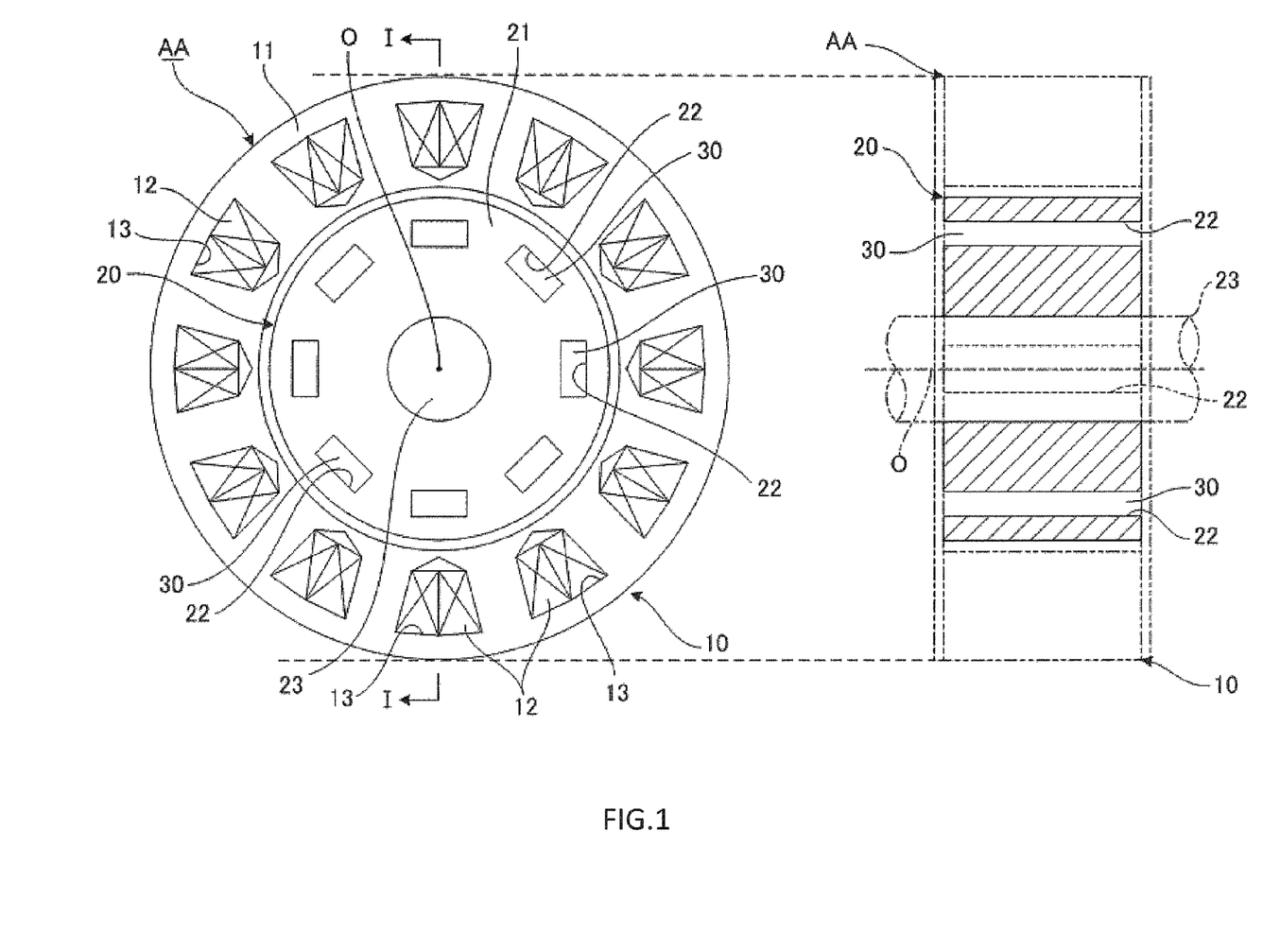
FIG. 1 is a schematic view of a configuration showing an essential part of a rotating electrical machine including a rotor into which magnets are inserted into a magnet insertion slot of a rotor core by means of a magnet inserting apparatus of the present embodiment.

FIG. 1 is a schematic view of a configuration showing an essential part of a rotating electrical machine including a rotor into which magnets are inserted into magnet insertion slots of a rotor core by means of the magnet inserting apparatus in the present embodiment. In FIG. 1, the drawing on the left side is a cross-section view of the rotating electrical machine, and the drawing on the right side is a side view thereof. The rotating electrical machine AA includes a stator 10 shaped as a circular ring configuring a portion of a casing not shown in the drawings, and a pillar-shaped rotor 20 disposed concentrically with the stator 10. The rotating electrical machine AA is, for example, an electric motor, and is used as a driving source for electric automobiles and hybrid automobiles. However, the rotating electrical machine may also be a generator, and use thereof is not limited to an automobile.

The stator 10 includes a stator core 11 and a plurality of coils 12. The plurality of the coils 12 is accommodated in slots 13 formed in the stator core 11, which slots 13 are provided in intervals of equal angles along one circumference whose center serves as a shaft center O.

The rotor 20 includes a rotor core 21, a rotation axis 23 which rotates integrally with the rotor core 21, and a plurality of field pole magnet bodies 30. The plurality of the field pole magnet bodies 30 is accommodated in magnet insertion slots 22 formed in the rotor core 21, which magnet insertion slots 22 are provided in intervals of equal angles along one circumference whose center serves as the shaft center O.

Figure 2:
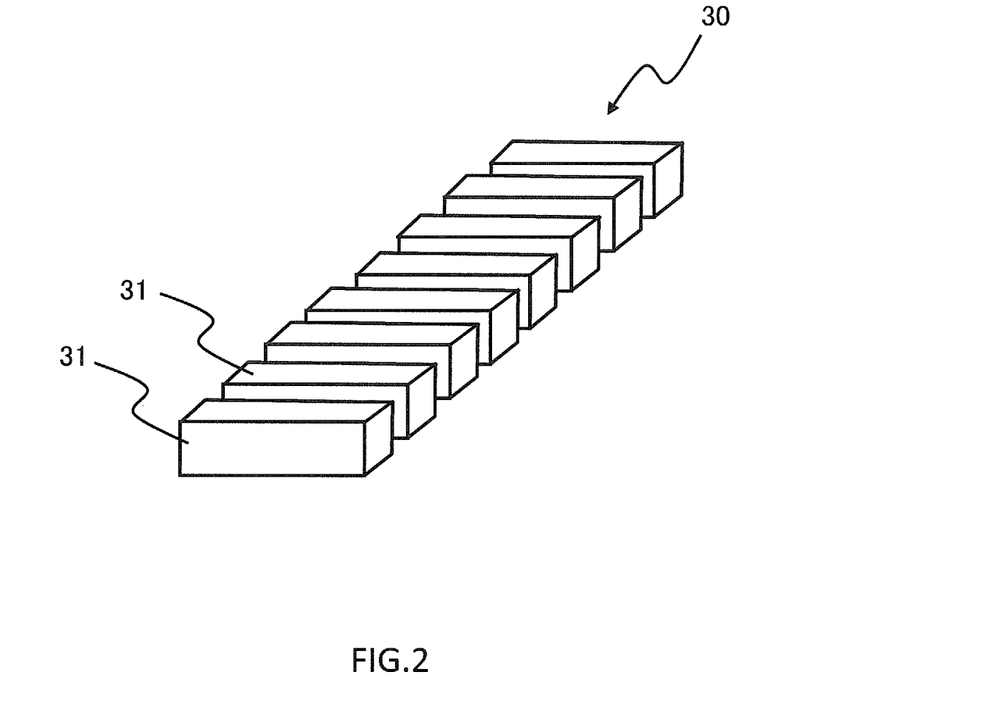
FIG. 2 is a view showing a plurality of magnet parts to be inserted into the magnet insertion slot.

As shown in FIG. 2, the field pole magnet body 30 to be accommodated in the magnet insertion slot 22 of the rotor 20 is configured as a cluster of magnet parts 31 aligned in one row obtained by bonding, with resin, a plurality of the magnet parts 31 cut and divided from a long plate-shaped magnet body 30. However, as will be discussed later, the field pole magnet body 30 will be inserted into the magnet insertion slot 22 in the cut and divided state of the magnet parts. Then, in a state in which all of the magnet parts 31 are inserted into the magnet insertion slot 22, all of the magnet parts 31 are integrated as one in the magnet insertion slot 22 by using resin.

Next, explanation will be made as to the method of inserting the plurality of the magnet parts 31 into the magnet insertion slot 22 by using the magnet inserting apparatus for magnet insertion into the magnet insertion slots of the rotor core of this embodiment, using FIG. 3 to FIG. 10. The plurality of the magnet parts 31 is inserted one by one into the magnet insertion slots 22 of the rotor core 21, which magnet insertion slots 22 are arranged in a direction of the rotation axis of the rotor 20. However, the number of the magnet to be inserted at a time may be two or more.

Figure 3:
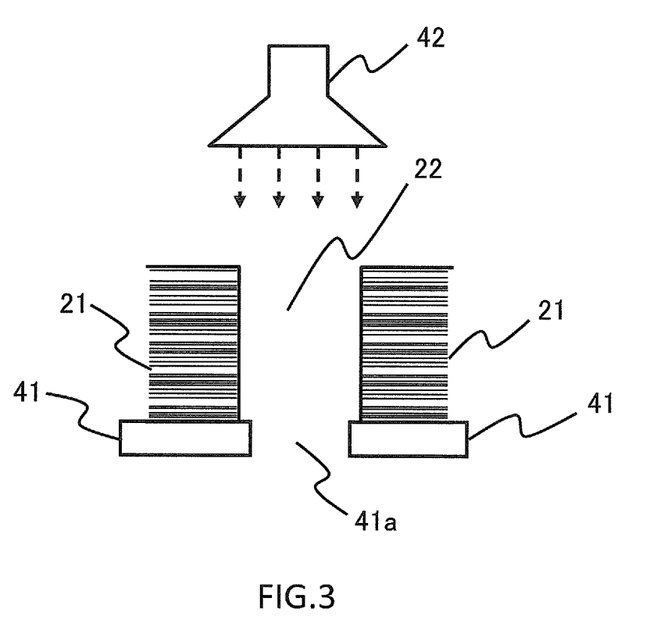
FIG. 3 is a view explaining a process of setting the rotor core on a magnet lower end positioning jig and detecting a position of the magnet insertion slot.

At first, the rotor core 21 is set on a rotor core supporting plate 41 (see FIG. 3). The rotor core supporting plate 41 has a hole 41a whose size is smaller than that of the magnet insertion slot 22 of the rotor core 21.

A magnet insertion slot position detecting apparatus 42 is an apparatus configured to detect a position of the magnet insertion slot 22 of the rotor core 21 in high accuracy, and is a non-contact laser detecting apparatus, a touch probe type coordinate measuring machine, or an apparatus detecting a position by image processing, for example.

Figure 4:
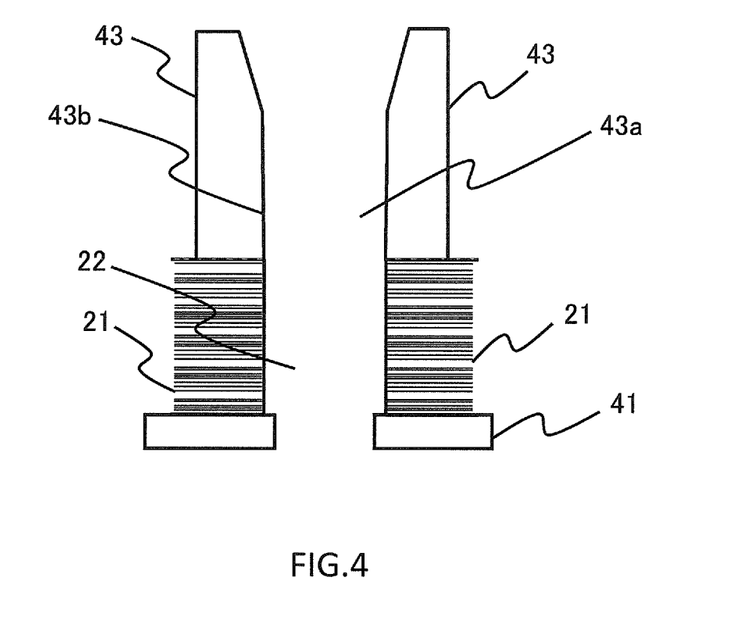
FIG. 4 is a view explaining a process of setting a guiding jig on the rotor core.

Next, on the basis of the position of the magnet insertion slot 22 detected by the magnet insertion slot position detecting apparatus 42, a guiding jig 43 is set on the rotor core 21 (see FIG. 4). The guiding jig 43 may be set by using, for example, a simple robot.

The guiding jig 43 has a magnet aligning hole 43a for aligning the magnet parts 31 to be introduced into the magnet insertion slot 22 of the rotor core 21. The upper part of the magnet aligning hole 43a is formed as a tapered shape so that the magnet parts 31 may be inserted readily. That is, the size of the hole of the upper end of the guiding jig 43, namely an inlet of the magnet parts 31, is larger than the size of the hole of the lower end of the guiding jig 43, namely an outlet of the magnet parts 31 (magnet aligning hole 43a), and is larger than the size of the magnet insertion slot 22 of the rotor core 21. In order that the magnet parts 31 which pass through the magnet aligning hole 43a of the guiding jig 43 does not get caught at the inlet of the magnet insertion slot 22 when the magnet parts 31 enter the magnet insertion slot 22 of the rotor core 21, the size of the hole at the lower end of the guiding jig 43 (magnet aligning hole 43a) is the same as or smaller than the size of the magnet insertion slot 22 of the rotor core 21.

If the size of magnet aligning hole 43a is the same as the size of the magnet insertion slot 22 of the rotor core 21, the guiding jig 43 is set in such a way that the position of the side wall of the magnet aligning hole 43a coincides with that of the side wall of the magnet insertion slot 22 of the rotor core 21. If the size of magnet aligning hole 43a is smaller than the size of the magnet insertion slot 22 of the rotor core 21, the guiding jig 43 is set in such a way that the position of the side wall of the magnet aligning hole 43a is positioned internally of the side wall of the magnet insertion slot 22.

The inside of the guiding jig 43, namely, a side wall 43b configuring the magnet aligning hole 43a, is applied with a surface coating such as a DLC coating (diamond-like coating) or a CrN coating (chromium nitride coating), to reduce friction force and to improve abrasion resistance.

Figure 5:
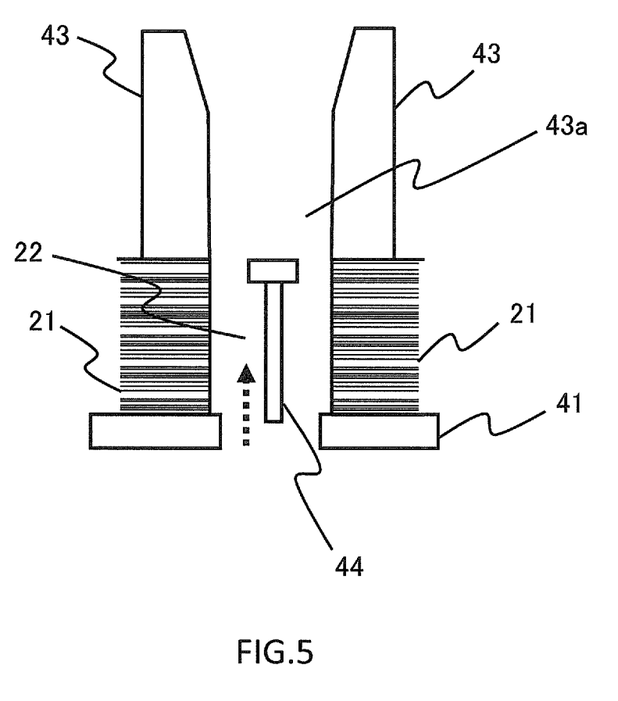
FIG. 5 is a view explaining a process of inserting a lower side push rod into the magnet insertion slot of the rotor core from below the rotor core, which lower side push rod is stopped at a lower end position of the guiding jig.

Next, a lower side push rod 44 is inserted into the magnet insertion slot 22 of the rotor core 21 from below the rotor core supporting plate 41 and the rotor core 21, and is stopped at the lower end position of the guiding jig 43 (see FIG. 5). Meanwhile, the lower side push rod 44 can be actuated by an actuator not shown in the drawings.

Figure 6:
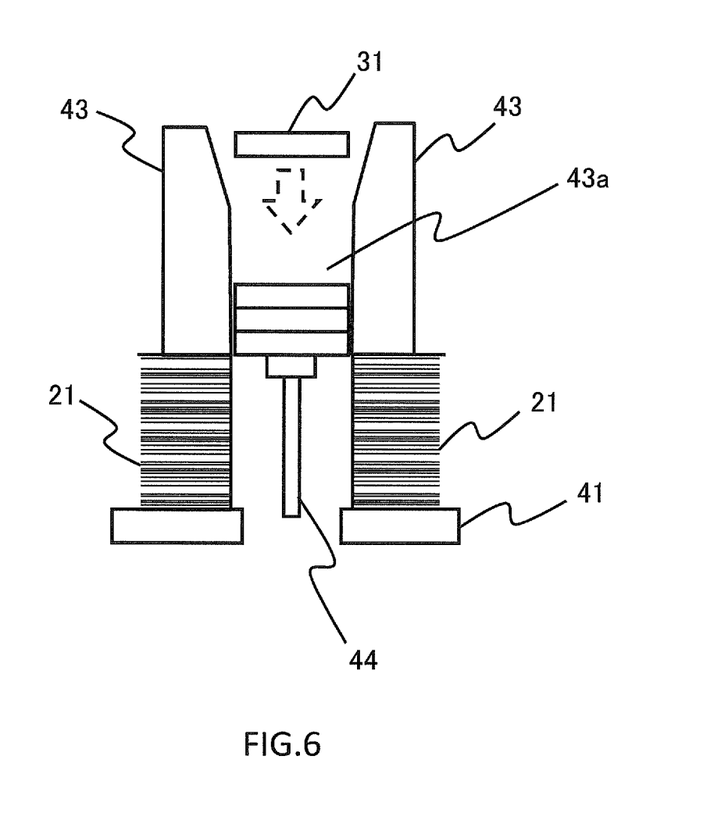
FIG. 6 is a view explaining a process of inserting the magnet parts one by one from above the guiding jig.

Next, the magnet parts 31 are inserted one by one from above the guiding jig 43 (see FIG. 6). The size of the upper part of the guiding jig 43 (magnet inlet) is larger than the size of the magnet insertion slot 22 of the rotor core 21, and the shape thereof is a tapered shape. Thus, high accuracy positioning is not necessary at the time when the magnet parts are inserted. The magnet part 31 inserted at first, drops down inside the magnet aligning hole 43a of the guiding jig 43, and stops on the lower side push rod 44. The magnet parts 31 inserted thereafter are stacked on the magnet part(s) 31 that has(have) been previously inserted and stacked. In this way, the plurality of the inserted magnet parts 31 are aligned with high precision without any lateral misalignment within the magnet aligning hole 43a of the guiding jig 43.

Figure 7:
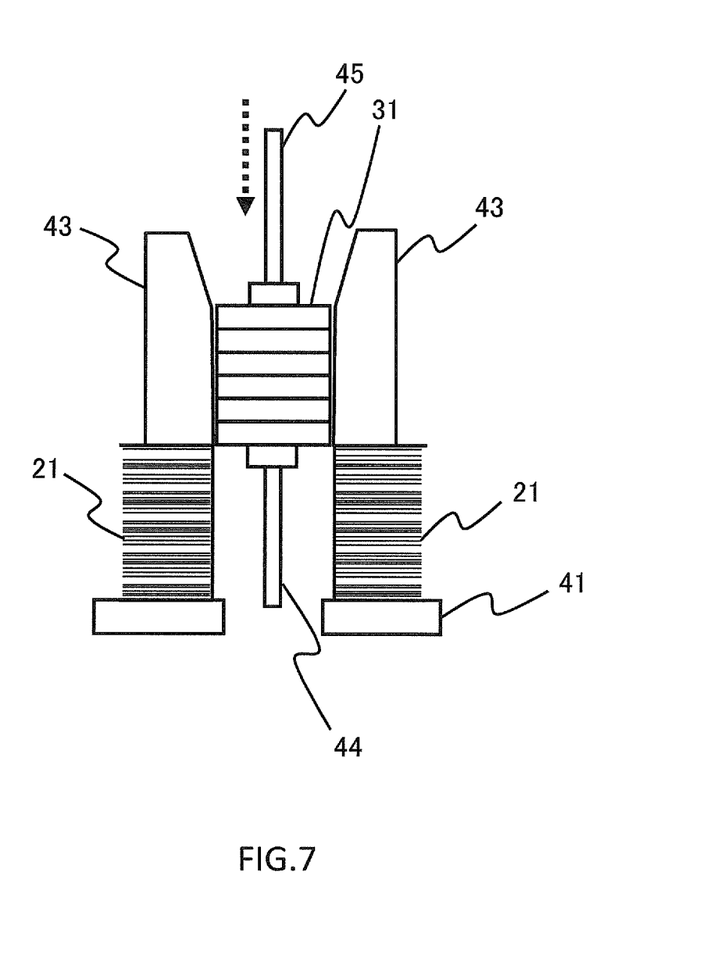
FIG. 7 is a view explaining a process of sandwiching a plurality of the magnet parts with an upper side push rod and the lower side push rod.
Figure 8:
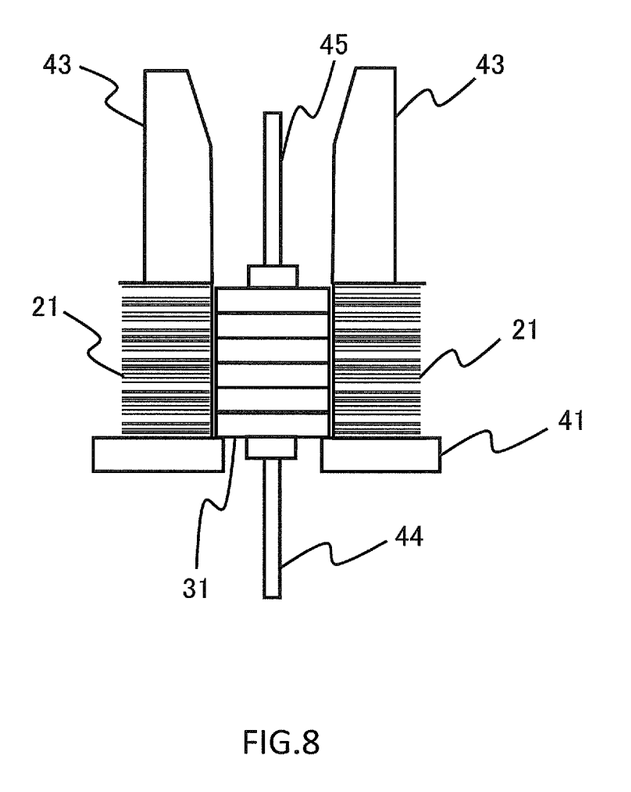
FIG. 8 is a view explaining a process of lowering the upper side push rod and the lower side push rod that sandwich the plurality of magnet parts therebetween.

Next, the upper side push rod 45 is inserted toward the magnet aligning hole 43a of the guiding jig 43 from above the guiding jig 43, so that the plurality of the magnet parts 31 are sandwiched between the upper side push rod 45 and the lower side push rod 44 (see FIG. 7). In this way, the plurality of the magnet parts 31 are sandwiched between the upper side push rod 45 and the lower side push rod 44, thereby resulting in a state of allowing no lateral misalignment. Meanwhile, the upper side push rod 45 can be actuated by an actuator which is not shown in the drawings.

Next, in the state in which the plurality of the magnet parts 31 are sandwiched, the upper side push rod 45 and the lower side push rod 44 are lowered until the lowest magnet part 31 come into contact with the upper end of the rotor core supporting plate 41. In this way, the plurality of the magnet parts 31 are inserted into the magnet insertion slot 22 of the rotor core 21 in a state of allowing no lateral misalignment (see FIG. 8).

Figure 9:
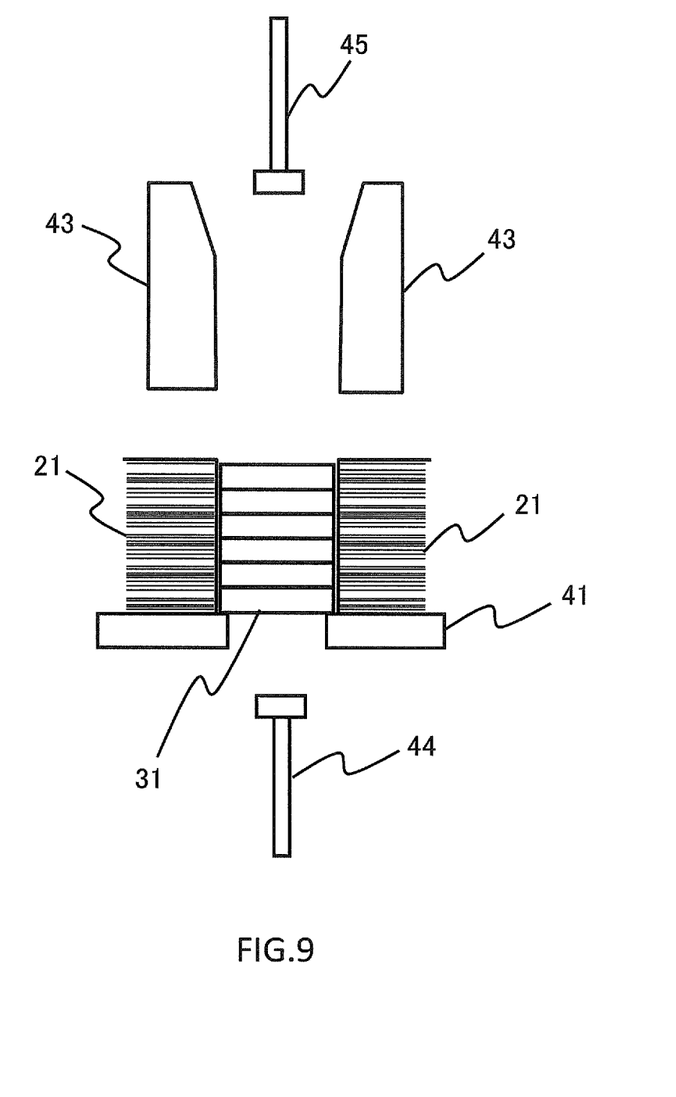
FIG. 9 is a view explaining a process of returning the guiding jig, the lower side push rod, and the upper side push rod to their respective initial positions.

Finally, the guiding jig 43, the lower side push rod 44, and the upper side push rod 45 are returned to their respective initial positions (see FIG. 9). That is, the guiding jig 43 is removed from the rotor core 21, and the lower side push rod 44 and upper side push rod 45 are moved downwards and upwards, respectively.

When all of the magnet parts 31 are inserted into the magnet insertion slots 22 of the rotor core 21, treatment to fix the plurality of the magnet parts 31 in the magnet insertion slot 22 by resin molding is executed in a resin molding process, which is a subsequent step. Meanwhile, in order to prevent the magnet parts inserted into the magnet insertion slot 22 from dropping down, the rotor core supporting plate 41 is transported together with the rotor core 21 when transporting the rotor core 21 to the magnet resin molding process.

Modifications:

In the explanation mentioned above, the plurality of the magnet parts 31 are inserted into the magnet insertion slot 22 from above of the rotor core 21. The insertion thereof into the magnet insertion slot 22, however, may also be done from below the rotor core 21.

Figure 10:
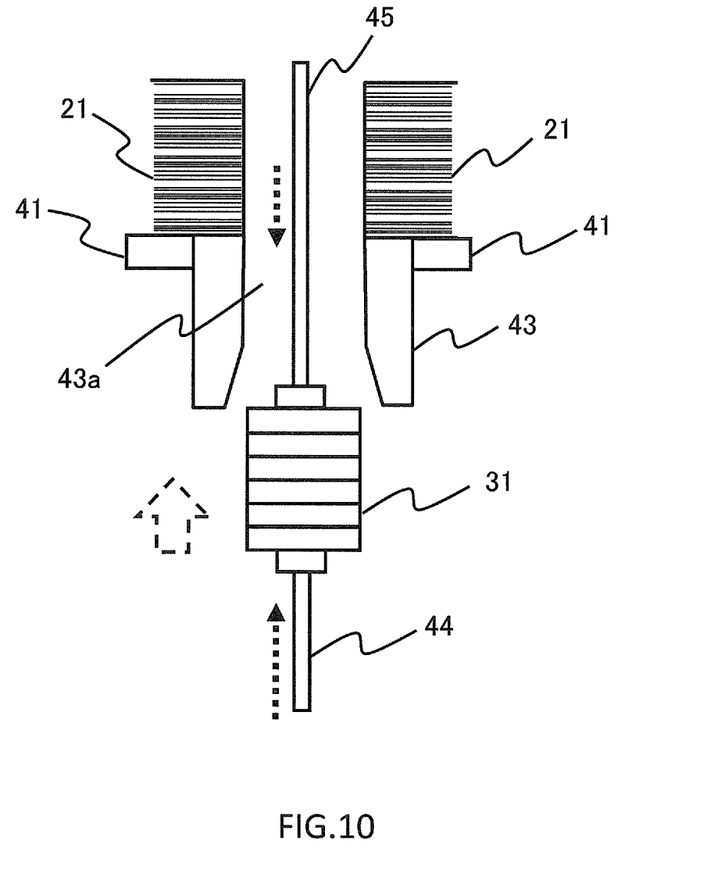
FIG. 10 is a view explaining a method of inserting a plurality of magnet parts into a magnet insertion slot from below the rotor core.

FIG. 10 is a view explaining a method of inserting the plurality of magnet parts 31 into the magnet insertion slot 22 from below the rotor core 21.

At first, the rotor core 21 is set on the rotor core supporting plate 41. The rotor core supporting plate 41 has a hole configured to set the guiding jig 43 inside the rotor core supporting plate 41, as explained later. Moreover, the position of the magnet insertion slot 22 is detected by a magnet insertion slot position detecting apparatus not shown in the drawings.

Next, on the basis of the position of the magnet insertion slot 22 detected by the magnet insertion slot position detecting apparatus, the guiding jig 43 is set under the rotor core 21 and on the inner side of the rotor core supporting plate 41 (see FIG. 10).

Then, the plurality of the magnet parts 31 is temporarily stacked directly on the lower side push rod 44. In this process, it is not necessary to stack the plurality of the magnet parts 31 at high precision so that no lateral misalignment occurs.

Next, the upper side push rod 45 is lowered from above the rotor core 21 so as to pass through the magnet insertion slot 22, to sandwich the plurality of the temporarily stacked magnet parts 31 with the upper side push rod 45 and the lower side push rod 44. In a state in which the plurality of the magnet parts 31 are sandwiched so as not to collapse, the upper side push rod 45 and the lower side push rod 44 are raised to insert the plurality of the magnet parts 31 into the magnet aligning hole 43a of the guiding jig 43. At this time, once the insertion of the magnet parts 31 into the magnet aligning hole 43a begins, there is no fear that the magnet parts 31 will collapse. Thus, the force to sandwich the magnet parts 31 is weakened by slightly raising the upper side push rod 45. In this way, the plurality of the magnet parts 31 are aligned with high precision without any lateral misalignment within the magnet aligning hole 43a of the guiding jig 43.

When all of the magnet parts 31 are aligned in the magnet aligning hole 43a, the plurality of the magnet parts 31 are sandwiched again by the upper side push rod 45 and the lower side push rod 44 to prevent any lateral misalignment, and in this state, the upper side push rod 45 and the lower side push rod 44 are raised to insert the plurality of the magnet parts 31 into the magnet insertion slot 22 of the rotor core 21. Meanwhile, by providing an upper end positioning member to determine a position of the upper end of the magnet parts within the magnet insertion slot 22 and raising the upper side push rod 45 and the lower side push rod 44 until the uppermost magnet part 31 of the plurality of the magnet parts 31 comes into contact with the upper end positioning member, it is possible to readily position the plurality of the magnet parts 31 in the magnet insertion slot 22.

After the plurality of the magnet parts 31 are inserted into the magnet insertion slot 22 of the rotor core 21, the guiding jig 43, the lower side push rod 44, and the upper side push rod 45 are returned to their respective initial positions. However, in this modification, in order to prevent the plurality of the magnet parts 31 from dropping, it is necessary to attach a magnet part supporting member that is a different member of the rotor core supporting plate 41, before the lower side push rod 44 is returned to its initial position.

As discussed above, a magnet inserting apparatus for magnet insertion into the magnet insertion slots of the rotor core of one embodiment includes a guiding jig 43 having a magnet inlet and a magnet outlet, for aligning a plurality of magnet parts 31 inserted into the magnet inlet until they are ejected from the magnet outlet so that the plurality of the aligned magnet parts 31 are inserted into the magnet insertion slot 22 via the magnet outlet. The size of the magnet inlet of the guiding jig 43 is larger than the size of the magnet insertion slot 22 and is the same as or smaller than the size of the magnet insertion slot 22, and the guiding jig is shaped as a tapered shape from the magnet inlet to midway towards the magnet outlet. There is just the need to insert the magnet parts 31 into the magnet inlet of the tapered-shaped guiding jig 43, to insert the magnet parts 31 into the magnet insertion slot 22. This thus allows for inserting the magnet parts 31 into the magnet insertion slot 22 without requiring high precision positioning. In this way, it is possible to manufacture the magnet inserting apparatus for magnet insertion into the magnet insertion slots of the rotor core with low costs, thereby allowing the reduction in manufacturing costs of a motor.

Moreover, because the plurality of the magnet parts 31 can be smoothly inserted into the magnet insertion slot 22 after they are aligned by the guiding jig 43, there is no need to chamfer the corner of the magnet parts 31, and thus the chamfering procedure can be omitted. In addition, chamfering of the corners of the magnet part 31 would cause a decrease in performance of the magnet due to the reduced volume of the magnets, however no such problem would occur.

In addition, if an attempt is made to insert the magnet parts 31 into the magnet insertion slot 22 of the rotor core as they are, the weight of one magnet part is smaller as compared with a case in which the long plate-shaped magnet is inserted, and thus dropping energy at the time of magnet insertion will become smaller by the same amount. Consequently, this leads to a problem that when the magnet part 31 contacts a side wall of the magnet insertion slot 22, the magnet part 31 would tilt in its pose due to friction resistance thereof and the magnet part 31 would readily be caught up in the middle of the magnet insertion slot 22. However, according to the present embodiment, the plurality of the magnet parts 31 are inserted into the magnet insertion slot 22 after they are aligned in the guiding jig 43; this thus prevents the problem of the magnet part 31 being readily caught up in the middle of the magnet insertion slot 22, which catching of the magnet part 31 is caused by tilting of the magnet part 31 in its pose caused by the magnet part 31 coming into contact with the side wall of the magnet insertion slot 22.

Moreover, according to the magnet inserting apparatus for magnet insertion into the magnet insertion slots of the rotor core in one embodiment, the plurality of the magnet parts 31 inserted into the magnet inlet positioned at the upper side of the guiding jig 43 is supported by the lower side push rod 44 from below, so that the magnet parts 31 do not drop from the magnet outlet positioned on the lower side of the guiding jig 43. Furthermore, the plurality of the magnet parts 31 are inserted into the magnet insertion slot 22 by lowering the lower side push rod 44 in a state in which the plurality of the magnet parts are supported by the lower side push rod 44. In this way, the plurality of the magnet parts 31 are aligned with high precision without any lateral misalignment within the magnet aligning hole 43a of the guiding jig 43, which thus allows for inserting the plurality of the magnet parts 31 accurately into the magnet insertion slot 22.

In addition, since the position of the magnet insertion slot is detected and the guiding jig 43 is set on the rotor core 21 on the basis of the detected position of the magnet insertion slot, it is possible to insert the plurality of the magnet parts 31 accurately into the magnet insertion slot 22.

Moreover, the plurality of the magnet parts 31 is inserted into the magnet insertion slot 22 by lowering the lower side push rod 44 and the upper side push rode 45 in a state in which the plurality of the magnet parts 31 are sandwiched by the lower side push rod 44 and the upper side push rode 45. In this way, it is possible to prevent the occurrence of any collapsing or lateral misalignment of the magnet parts at the time when the plurality of the magnet parts 31 are inserted into the magnet insertion slot 22 from the guiding jig 43.

Moreover, there may be an alternative method wherein the stacked plurality of magnet parts 31 are supported from below by the lower side push rod 44, the lower side push rod 44 is raised in a state in which the plurality of the magnet parts 31 are supported by the lower side push rod 44, to insert the plurality of the magnet parts 31 from the magnet inlet provided at a lower side of the guiding jig 43, and further lifting the lower side push rod 44 in the state in which the plurality of the magnet parts 31 are aligned by the guiding jig 43 to insert the plurality of the magnet parts 31 into the magnet insertion slot 22 via the magnet outlet provided at the upper side of the guiding jig 43. According to this method, the plurality of the magnet parts 31 are inserted inside the guiding jig 43 after being temporarily stacked on the lower side push rod 44; there is no necessity to wait until the plurality of the magnet parts 31 is stacked inside the guiding jig 43, and thus allows for inserting the plurality of the magnet parts 31 into the magnet insertion slot 22 more rapidly.

The present invention is not limited to the one embodiment as mentioned above, and various modification and application thereof are possible.

The invention claimed is:

1. A magnet inserting apparatus into magnet insertion slots of a rotor core for inserting a plurality of magnet parts into each of the magnet insertion slots provided in the rotor core of a motor, the magnet inserting apparatus comprising:
    a guiding unit equipped with a magnet inlet and a magnet outlet, the guiding unit being configured to align the plurality of magnet parts inserted through the magnet inlet until the inserted magnet parts are ejected from the magnet outlet, the guiding unit being configured to guide the aligned magnet parts so as to be inserted from the magnet outlet to the magnet insertion slot;
    a supporting unit configured to support the plurality of magnet parts from below so that the magnet parts do not fall down from the magnet outlet positioned at a lower side of the guiding unit, the plurality of magnet parts being inserted from the magnet inlet positioned at an upper side of the guide unit; and
    a lowering unit configured to lower the supporting unit in a state that the magnet parts are supported by the supporting unit so as to cause the magnet parts to be inserted into the magnet insertion slot,
    wherein a size of the magnet inlet is larger than a size of the magnet insertion slot, a size of the magnet outlet is the same as or smaller than the size of the magnet insertion slot, and the guiding unit is formed so that a shape from the magnet inlet to the magnet outlet becomes a taper shape.

2. The magnet inserting apparatus according to claim 1, further comprising:
    a pressing unit configured to press the plurality of magnet parts supported by the supporting unit from an upper side so as to be sandwiched between the supporting unit and the pressing unit,
    wherein the lowering unit lowers the supporting unit and the pressing unit in a state that the magnet parts are sandwiched between the supporting unit and the pressing unit so as to cause the magnet parts to be inserted into the magnet insertion slot.

3. The magnet inserting apparatus according to claim 1, further comprising:
    a magnet insertion slot position detecting unit configured to detect a position of the magnet insertion slot; and
    a locating unit configured to locate the guiding unit on the rotor core on the basis of the position of the magnet insertion slot detected by the magnet insertion slot position detecting unit.

4. The magnet inserting apparatus according to claim 1, further comprising:
    a supporting unit configured to support the plurality of stacked magnet parts from below; and
    a raising unit configured to raise the supporting unit in a state that the magnet parts are supported by the supporting unit so as to cause the magnet parts to be inserted from the magnet inlet provided at a lower side of the guiding unit, the raising unit being configured to further raise the supporting unit in a state that the magnet parts are aligned by the guiding unit so as to cause the magnet parts to be inserted into the magnet insertion slot from the magnet outlet provided at an upper side of the guiding unit.

5. A magnet inserting method into magnet insertion slots of a rotor core for inserting a plurality of magnet parts into each of magnet insertion slots provided in the rotor core of a motor by the magnet inserting apparatus according to claim 1, the magnet inserting method comprising:
    by using a guiding unit equipped with a magnet inlet and a magnet outlet, inserting the plurality of magnet parts through the magnet inlet to align the inserted magnet parts until the magnet parts are ejected from the magnet outlet; and
    inserting the aligned magnet parts into the magnet insertion slot through the magnet outlet,
    wherein a size of the magnet inlet is larger than a size of the magnet insertion slot, a size of the magnet outlet is the same as or smaller than the size of the magnet insertion slot, and the guiding unit is formed so that a shape from the magnet inlet to the magnet outlet becomes a taper shape.

* * * * *